United States Patent
Shim et al.

(10) Patent No.: US 7,702,087 B2
(45) Date of Patent: Apr. 20, 2010

(54) METHOD AND APPARATUS FOR ACTIVATING AND MANAGING VOIP PHONE WITH RFID

(75) Inventors: Choon B. Shim, Ijamsville, MD (US); Joonbum Byun, Gaithersburg, MD (US)

(73) Assignee: Cisco Technology, Inc, San Jose, CA (US)

( * ) Notice: Subject to any disclaimer, the term of this patent is extended or adjusted under 35 U.S.C. 154(b) by 857 days.

(21) Appl. No.: 11/217,421

(22) Filed: Sep. 2, 2005

(65) Prior Publication Data

US 2007/0066221 A1    Mar. 22, 2007

(51) Int. Cl.
*H04M 11/00* (2006.01)
*H04L 12/66* (2006.01)

(52) U.S. Cl. .............. 379/93.05; 379/90.01; 379/91.02; 455/456.1; 455/456.2; 455/456.3

(58) Field of Classification Search .............. 379/93.05, 379/90.01, 91.02, 93.06, 93.17, 3.28, 93.29; 370/352–355; 455/41.1, 41.2, 41.3, 456.1, 455/456.2, 456.3, 456.4, 456.5, 456.6; 340/572.1
See application file for complete search history.

(56) References Cited

U.S. PATENT DOCUMENTS

| | | | |
|---|---|---|---|
| 6,249,812 B1 * | 6/2001 | Cromer et al. .............. 709/221 |
| 7,305,090 B1 * | 12/2007 | Hayes et al. .............. 380/249 |
| 2004/0186768 A1 * | 9/2004 | Wakim et al. .............. 705/14 |
| 2004/0219948 A1 * | 11/2004 | Jones et al. .............. 455/552.1 |
| 2005/0076034 A1 | 4/2005 | Addonisio et al. |
| 2005/0160138 A1 * | 7/2005 | Ishidoshiro .............. 709/203 |
| 2006/0029050 A1 * | 2/2006 | Harris et al. .............. 370/356 |
| 2006/0121916 A1 * | 6/2006 | Aborn et al. .............. 455/456.5 |
| 2006/0153122 A1 * | 7/2006 | Hinman et al. .............. 370/328 |

OTHER PUBLICATIONS

Paltemaa; Mechanism for Managing Mobility in telecommunication networks; Oct. 10, 2002; WO 02/080491 A1.*

* cited by examiner

*Primary Examiner*—Melur Ramakrishnaiah
(74) *Attorney, Agent, or Firm*—Schwegman, Lundberg & Woessner, P.A.

(57) ABSTRACT

An apparatus equipped with Radio Frequency Identity (RFID) reader and LAN/WAN access reads an RFID tag attached to a Video and Voice Over Internet Protocol (VoIP) phone. The apparatus retrieves phone information, including such information as an Ethernet Media Access Control (MAC) address from the RFID tag and requests that a VoIP call server register the phone automatically. A VoIP service operator can register multiple phones without opening phone packaging. Additional information such as a directory number (DN) or a phone user name can be associated with the phone during the registration process using the apparatus.

12 Claims, 2 Drawing Sheets

US 7,702,087 B2

METHOD AND APPARATUS FOR ACTIVATING AND MANAGING VOIP PHONE WITH RFID

BACKGROUND

The technology in this application pertains to an apparatus and a process for registering telecommunications equipment. In one arrangement the apparatus and process are useful for registering video and voice over IP (VoIP) phones to an IP (Internet Protocol) PBX system and effect activation of the phone.

Typically, new telecommunications equipment, such as a new Video Voice over IP (VoIP) phone needs to be registered and activated before a purchaser or customer can make use of the equipment. Today, commonly the new VoIP phone must first be removed from the packaging before it can be registered and the registration operation is a manual process. Once the package is opened the person responsible for effecting registration usually then reads the Ethernet Media Access Control (MAC) address printed on the phone. Then, that person manually enters the MAC address into a call server database along with other information such as directory number (DN), phone user name, or configuration of one or more special service features. When it comes to registering hundreds or thousands of phones at a time, it is extremely time consuming to register them manually.

Attempts have been made to provide an automatic bulk registration. For example, in one system automatic registration is enabled in a call server and new phones are automatically registered on the call server by simply hooking up the phones and providing power to the phone which then reads its own MAC address and reports it to its call server. The call server then assigns a pre-defined DN to the phone and activates the phone.

This known automated arrangement still requires that each phone be unpacked before activation. Furthermore, there is a security hole in this auto-registration technique. While the auto-registration is turned on, an intruder can bring in a new unauthorized phone, called a rogue phone, hook it up to the network and start to use the VoIP phone service illegally. If the VoIP call server can be accessed through a wireless network, the security hole becomes an even more critical issue. Anybody outside of the office space in which auto-registration is being performed, (e.g., out of the building or on another floor) can register his/her wireless phone automatically to the call server and start to use the phone service without proper authorization if that phone is within range of the wireless network.

SUMMARY

In a new automatic registration arrangement a VoIP phone has an attached radio frequency id (RFID) tag. An apparatus including a RFID tag reader detects the RFID tag attached to the phone and detects information associated with that tag, such as a MAC address of the phone, where that address is stored in RFID tag.

The apparatus can include the RFID reader along with computer software so that the apparatus can be coupled or connected to a local area network (LAN) and/or wide area network (WAN) so as to communicate with a VoIP call server or IP PBX. The apparatus, referred to as a VoIP phone register, can additionally be equipped with a display and keyboard so that a register operator can read the information displayed and enter any additional necessary information.

In accordance with a process for automatic registration, when a human operator brings a new, unregistered phone close to or within reading range of the register, a RFID tag attached to the phone is interrogated so as to read information stored within the package without having to open the package. This process and apparatus can handle bulk registration of unregistered phones by reading the RFID tags of the various phones, one by one, until all tags on all of the phones are read. Upon reading them successfully, the apparatus forwards, for each phone, a MAC address, one of the pieces of information retrieved from the RFID tags, to the call server asking that the addresses be registered in a call server's database as legitimate phones.

Meanwhile, the apparatus not only registers the phone with the VoIP call server database, but can also update an enterprise resource management (ERM) server. Once it gets information from a RFID tag on a phone, the apparatus can establish a connection with the ERM server and forward the phone information to the server asking to update its resource database. By doing this, the phone is activated to be ready for use and, at the same time, it is logged into an asset management system.

The register can have a display via which the operator can be given options to enter additional information required to configure the phone, such as a directory number (DN), user name or id, dial plan, special service information and security related information. These pieces of information are then associated with the phone MAC address and sent to the call server with a request to update the database accordingly.

The register is also capable of registering phones in bulk. As soon as the register reads a phone RFID tag, it registers the phone without any human intervention. A directory number (DN) can be assigned to each phone by fetching one such number from a DN pool which is pre-configured by a human operator in advance. It repeats the above procedure for each phone until all phones within its proximity are covered.

DETAILED DESCRIPTION

Figure 1:
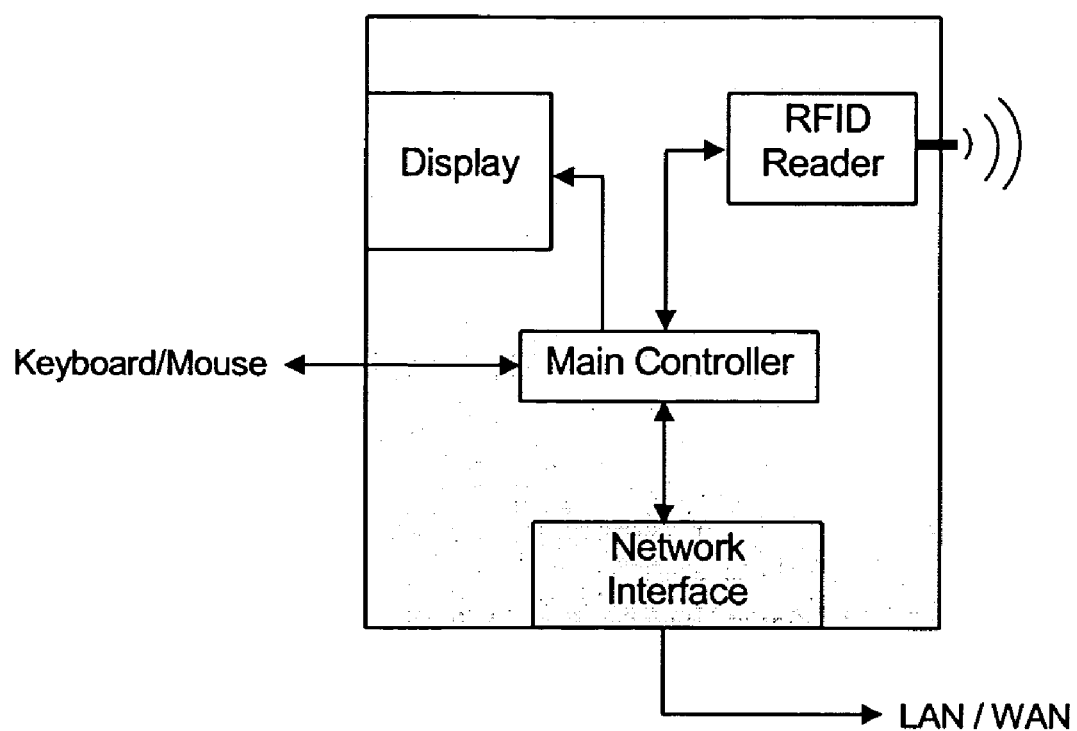
FIG. 1 is a block diagram useful for describing an embodiment of an apparatus to be used in automatically registering a new telecommunications equipment.

FIG. 1 is a block diagram of an apparatus that can be used for automating a process of registering telecommunications devices as Video Voice over IP (VoIP) phones. It is also applicable to wireless devices such as wireless VoIP phone with 802.11a/b/g WiFi wireless interface or 802.16a WiMax interface.

The arrangement of FIG. 1 has the ability to read a radio frequency identification (RFID) tag placed proximate to the device or apparatus. The device can obtain information from the tag and can both display that information to a user of the apparatus and communicate that information to one or more other devices via a selected communication channel.

The device 100 can include a display 110 such as a CRT, LCD or other known type of visual feedback device; an RFID tag reader 120 such as an active/passive type or low, high, ultra high and microwave frequency type; a main controller 130 which can be a microprocessor such as a Pentium, ARM or Power PC type or other processing unit; and a network interface 140 which can provide a communications interface to any of a number of communications networks such as a LAN, WAN, either wired or wireless. An input device or devices such as a keyboard and/or a mouse allow an operator to enter information into the device 100 such as in response to a visual cue from the display.

The main controller 130 has input/output interface to the RFID reader 120, keyboard/mouse/display and network interface 140.

In operation the RFID reader 120, under control of the main controller 130, can continuously scan to detect whether if there are any RFID tags within its radio signal reach or footprint and, if any is within such range, interrogates it. Once data stored in the detected tag is successfully read using a standard RFID protocol, the reader reports that information to the main controller. The data that can be retrieved from the RFID tag can include, but is not limited to, an RFID number, radio frequency band/protocol, phone Ethernet MAC (Media Access Control) address, phone serial number, phone model, hardware revision, manufacturer name and country of origin. Among the above data, the radio frequency band/protocol refers to the frequency range and the technology the phone uses. It is possible, depending on the phone equipment, that the phone can have the ability to operate in other multiple protocols. For example, it can be a combination of 802.11 and GSM/CDMA or combination of 802.16 and 802.11 or 802.16 and GSM/CDMA.

The main controller 130 can take the data captured by RFID reader 120 and forward information, including the phone MAC address, to the call server and request or command that the forwarded address be registered as a legitimate phone in the call server's database.

Figure 2:
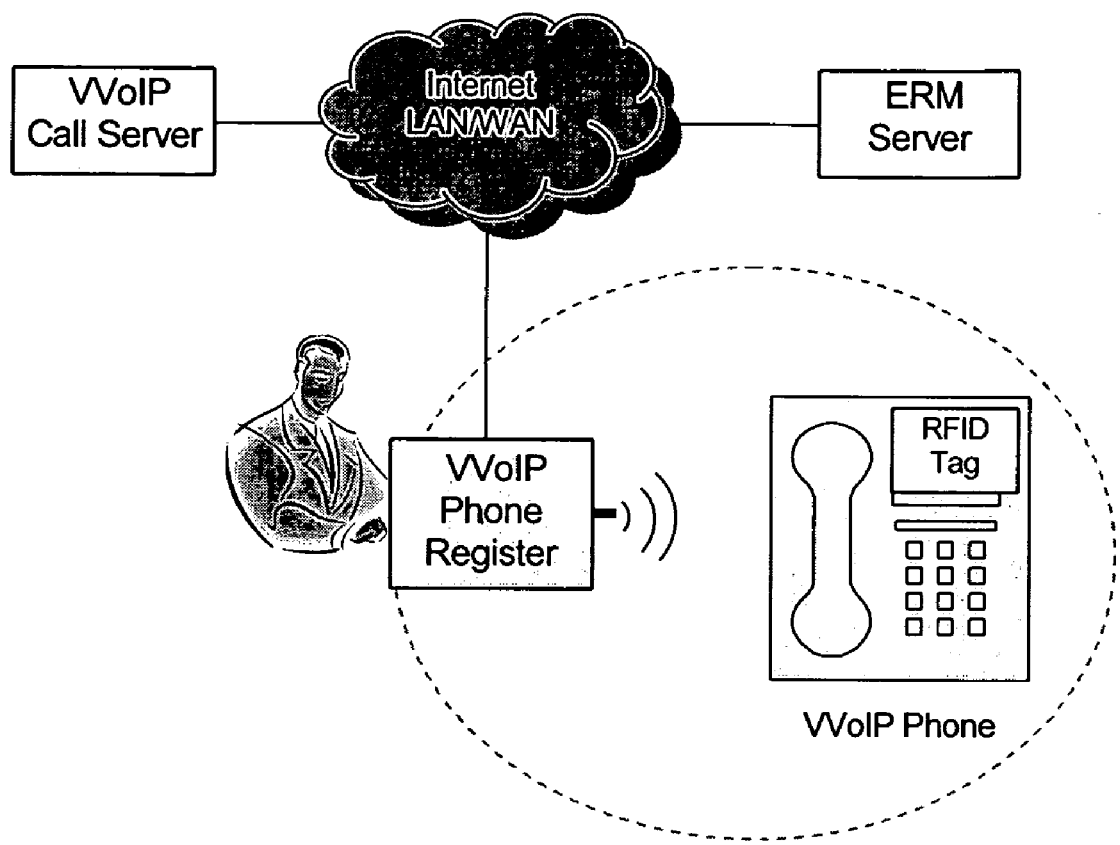
FIG. 2 is a block diagram useful for describing a communication environment in which the apparatus of FIG. 1 may be used.

FIG. 2 illustrates an overall architecture of automated registration of VoIP phone aided by the apparatus of FIG. 1. The phone register 100 can use one or more of various protocols to communicate with the call server or ERM server; examples include but are not limited to, ODBC (Online Database Communication), HTTP (Hyper Text Transfer Protocol, HTTPS (HTTP Secure), SOAP, rlogin, telnet, ssh or XML. Before any communication happens, the phone register will typically authenticate itself to the call server or ERM server to gain proper access right to the database.

In operation the phone register detects the RFID tag attached to the VoIP that is within range and reads the desired identification information from the tag. The information needed or desired is then transmitted via the network interface device of the register in a format appropriate for the communication network that is available to connect or couple the phone register to either the VoIP server or the ERM server or both. In the example shown the communication network is an IP network and can be a LAN or WAN or some combination thereof. The transmitted information is directed to either one of the servers or possibly both.

In the registration process the phone MAC address, a key index to identify a VoIP phone, can be accompanied by other information such as a directory number (DN) to be assigned to the phone, the person's name who will use the phone, dial plan or special service feature to be associated with the phone.

The telephone register under control of the main controller handles bulk registration of unregistered phones by reading the RFID tags one by one until all tags on the phones are read. Once the register reads a particular phone RFID tag, it registers the phone's MAC address without any human intervention. A DN can be assigned automatically to each phone by picking up one DN from a pool which is pre-defined by a human operator. After completion of one phone registration, the register scans for another phone belonging to the bulk and proceeds to the same processing until all phones in the bulk are registered.

The register can be embodied in a portable computing device such as a laptop PC or PDA (Portable Data Assistant), or other computing device having an input option (e.g., keyboard, mouse) and a visual output such as a monitor display. Through the user interface, the operator may be given options or cues to enter additional information required to configure the phone, such as directory number (DN), user name or id, dial plan, special service and security related information. A range of DNs may be entered through the interface so that they can be used as a DN pool. As a phone is registered, one DN is picked up from the pool and associated with a phone MAC address. The register can request that the call server configure the association.

The device or register can have the capability of storing in memory, such as a non-volatile memory, e.g., a hard disk or flash memory, information for one or more units of telecommunications equipment. For example the MAC address for two or more VoIP phones can be stored in non-volatile memory associated with the registration then, at a later time the register can access the information for the two or more VoIP phones and send that information to a call server requesting to update its database.

The register also displays processing status of the registration and result of that registration process e.g., success/failure/errors, on the display.

The apparatus can also update an enterprise resource management (ERM) server database to enlist the new phone as an enterprise asset. Once it gets information from the RFID tag on a phone, the register establishes a connection with ERM server and forwards the phone information to the server requesting or commanding an update of the resource database. By doing this, the phone is activated, ready to be used, while at the same time it is logged in to an asset management system.

Thus a method and apparatus provide the capability of a more automated operation of registering telecommunications devices, such as VoIP phones, without exposing a given network to additional vulnerability to rogue phone access.

What is claimed is:

1. A process for providing registration information about a telecommunications device to a communications services provider, comprising:

detecting a presence of radio frequency identification tag (RFID tag) associated with a telecommunications device;

obtaining profile information about the associated telecommunications device from the RFID tag; said profile information including a Media Access Control (MAC) address;

automatically selecting at least the MAC address from the obtained profile information as registration information about the telecommunications device; and creating a registration message including said registration information, said registration message having a format appropriate for transmission to a communications services provider for first time registration of the telecommunications device with the communications service provider.

2. The process of claim 1 wherein the telecommunications device comprises a video voice over internet protocol (VoIP) phone.

3. The process of claim 2 wherein said registration information for a VoIP phone includes a MAC address.

4. The process of claim 2 wherein said registration message further includes at least one other identification code to be associated with the phone.

5. The process of claim 1 further including, detecting a presence of radio frequency identification tag (RFID tag) associated with a second telecommunications device;

obtaining profile information about the associated second telecommunications device from the RFID tag;

automatically selecting at least a portion of the obtained profile information as registration information about a second telecommunications device; and creating a registration message including said second registration information, said second registration message having a format appropriate for transmission to a communications services provider for the first time registration of the second telecommunications device with the communications service provider.

6. The process of claim 5 further including transmitting the created registration message and the created second registration message toward the service provider so as to nearly-concurrently register multiple devices with the service provider.

7. The process of claim 1 wherein the registration message is created prior to an assignment of a Directory Number (DN).

8. The process of claim 1, wherein the telecommunications device is contained in a packaging, the profile information being obtained from the RFID tag before the telecommunications device is unpacked from the packaging.

9. The process of claim 1, including:

obtaining profile information about two or more telecommunications devices from RFID tags associated with the respective telecommunications devices, said profile information including respective MAC addresses;

storing the profile information of the two or more telecommunications devices; and at a later time, transmitting the profile information of the two or more telecommunications devices to the service provider nearly-concurrently, to provide bulk registration of the two or more devices.

10. An apparatus comprising:

a main controller;

a radio frequency identification tag (RFID tag) reader coupled to said main controller;

a display coupled to said main controller; and a communication network interface coupled to said main controller;

wherein said main controller has associated therewith software for executing a process by which, profile information concerning a video voice over internet protocol (VoIP) phone within range of said RFID tag is gathered, said profile information to include a Media Access Control (MAC) address of said phone; and the gathered profile information is processed to create a registration message that can be used for first time registration of the phone with a service provider.

11. The apparatus of claim 10 wherein said software can further cause the main controller to cause said display to provide a visual prompt for input of supplemental information to be associated with said profile information.

12. The apparatus of claim 10 wherein the registration message is created prior to an assignment of a Directory Number (DN).

\* \* \* \* \*

UNITED STATES PATENT AND TRADEMARK OFFICE
CERTIFICATE OF CORRECTION

PATENT NO.         : 7,702,087 B2                                               Page 1 of 1
APPLICATION NO.    : 11/217421
DATED              : April 20, 2010
INVENTOR(S)        : Choon B. Shim et al.

It is certified that error appears in the above-identified patent and that said Letters Patent is hereby corrected as shown below:

In column 4, line 44, in Claim 1, delete "of" and insert -- of a --, therefor.

In column 4, line 48, in Claim 1, delete "tag;" and insert -- tag, --, therefor.

In column 4, line 64, in Claim 3, delete "a" and insert -- said --, therefor.

In column 5, line 12, in Claim 5, after "for" delete "the".

Signed and Sealed this

Twenty-second Day of June, 2010

David J. Kappos
*Director of the United States Patent and Trademark Office*